(12) United States Patent
Nelluri et al.

(10) Patent No.: US 10,831,566 B1
(45) Date of Patent: Nov. 10, 2020

(54) ELECTRONIC SYSTEM FOR INTELLIGENT PROCESSING AND ROUTING OF INCOMING API REQUESTS BASED ON CONTEXT MATCHING

(71) Applicant: BANK OF AMERICA CORPORATION, Charlotte, NC (US)

(72) Inventors: Govinda Rajulu Nelluri, Telangana (IN); Birudharaju Shashank Raju, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/542,875

(22) Filed: Aug. 16, 2019

(51) Int. Cl.
  *G06F 3/00* (2006.01)
  *G06F 9/54* (2006.01)
  *G06N 20/00* (2019.01)
  *G06F 9/445* (2018.01)
  *G06F 16/951* (2019.01)

(52) U.S. Cl.
  CPC .......... *G06F 9/541* (2013.01); *G06F 9/44536* (2013.01); *G06F 16/951* (2019.01); *G06N 20/00* (2019.01)

(58) Field of Classification Search
  CPC ....................................... G06F 9/541
  USPC ........................................ 719/328
  See application file for complete search history.

(56) References Cited

U.S. PATENT DOCUMENTS

| | | |
|---|---|---|
| 7,047,535 B2 | 5/2006 | Lee et al. |
| 7,676,472 B2 | 3/2010 | Kurhekar et al. |
| 7,962,470 B2 | 6/2011 | Degenkolb et al. |
| 8,086,758 B1 | 12/2011 | Allan et al. |
| 8,271,998 B2 | 9/2012 | Dettori et al. |
| 8,549,471 B2 | 10/2013 | Jung et al. |
| 8,793,359 B1 | 7/2014 | Fiebig et al. |
| 9,262,237 B2 * | 2/2016 | Gopalraj ................. G06F 9/541 |
| 9,396,091 B2 | 7/2016 | Bally et al. |
| 9,778,924 B2 | 10/2017 | Batabyal et al. |
| 10,379,995 B1 * | 8/2019 | Walters ............... G06F 11/3636 |
| 2012/0158931 A1 | 6/2012 | Ohlman et al. |

OTHER PUBLICATIONS

Ahmad R. Qawasmeh, Adaptive OpenMP Task Scheduling Using Runtime APIs and Machine Learning. (Year: 2017).*

* cited by examiner

*Primary Examiner* — Lechi Truong
(74) *Attorney, Agent, or Firm* — Michael A. Springs; Moore & Van Allen PLLC; Nicholas C. Russell

(57) ABSTRACT

An electronic system is typically configured for crawling, via a machine learning model, into one or more API servers, wherein the one or more API servers comprise one or more versions of one or more APIs, capturing, via the machine learning model, information associated with the one or more versions of the one or more APIs, creating context objects associated with each of the one or more versions of the one or more APIs, receiving a real-time API request from a client system, processing the real-time API request received from the client system, and routing the real-time API request to an API version of the one or more versions.

12 Claims, 7 Drawing Sheets

ELECTRONIC SYSTEM FOR INTELLIGENT PROCESSING AND ROUTING OF INCOMING API REQUESTS BASED ON CONTEXT MATCHING

BACKGROUND

Current conventional systems route the incoming API requests using techniques such as API versioning, custom headers, accept headers or the like. However, using such techniques may be inefficient as there are multiple versions of APIs in any entity and the clients associated with the incoming requests need to provide headers and content in a certain format for the routing to work. As such, there exists a need for a system to intelligently process and route incoming API requests without using the techniques mentioned above.

BRIEF SUMMARY

Embodiments of the present invention address the above needs and/or achieve other advantages by providing apparatuses (e.g., a system, computer program product and/or other devices) and methods for intelligently processing and routing the incoming API requests based on context matching. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention. For sample, illustrative purposes, system environments will be summarized. The system may crawl, via machine learning model, into one or more API servers, wherein the one or more API servers comprise one or more versions of one or more APIs, capture, via the machine learning model, information associated with the one or more versions of the one or more APIs, create context objects associated with each of the one or more versions of the one or more APIs, receive a real-time API request from a client system, process the real-time API request received from the client system, and route the real-time API request to an API version of the one or more versions.

In some embodiments, the system sends a response to the client system based on routing the real-time API request, wherein the response is generated based on combining an output provided by the API version and context in a context object associated with the API version.

In some embodiments, the system determines that the API version does not exist in the one or more API servers and generates the API version in response to determining that the API version does not exist in the one or more API servers.

In some embodiments, the system processes the real-time API request based on identifying one or more requirements associated with the real-time API request.

In some embodiments, the system routes the real-time API request to the API version based on identifying a match between the one or more requirements and information associated with the API version.

In some embodiments, creating the context objects comprises creating context associated with each of the one or more API versions.

In some embodiments, the system identifies, via the machine learning model, differences between the one or more versions of the one or more APIs in response to crawling into the one or more API servers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
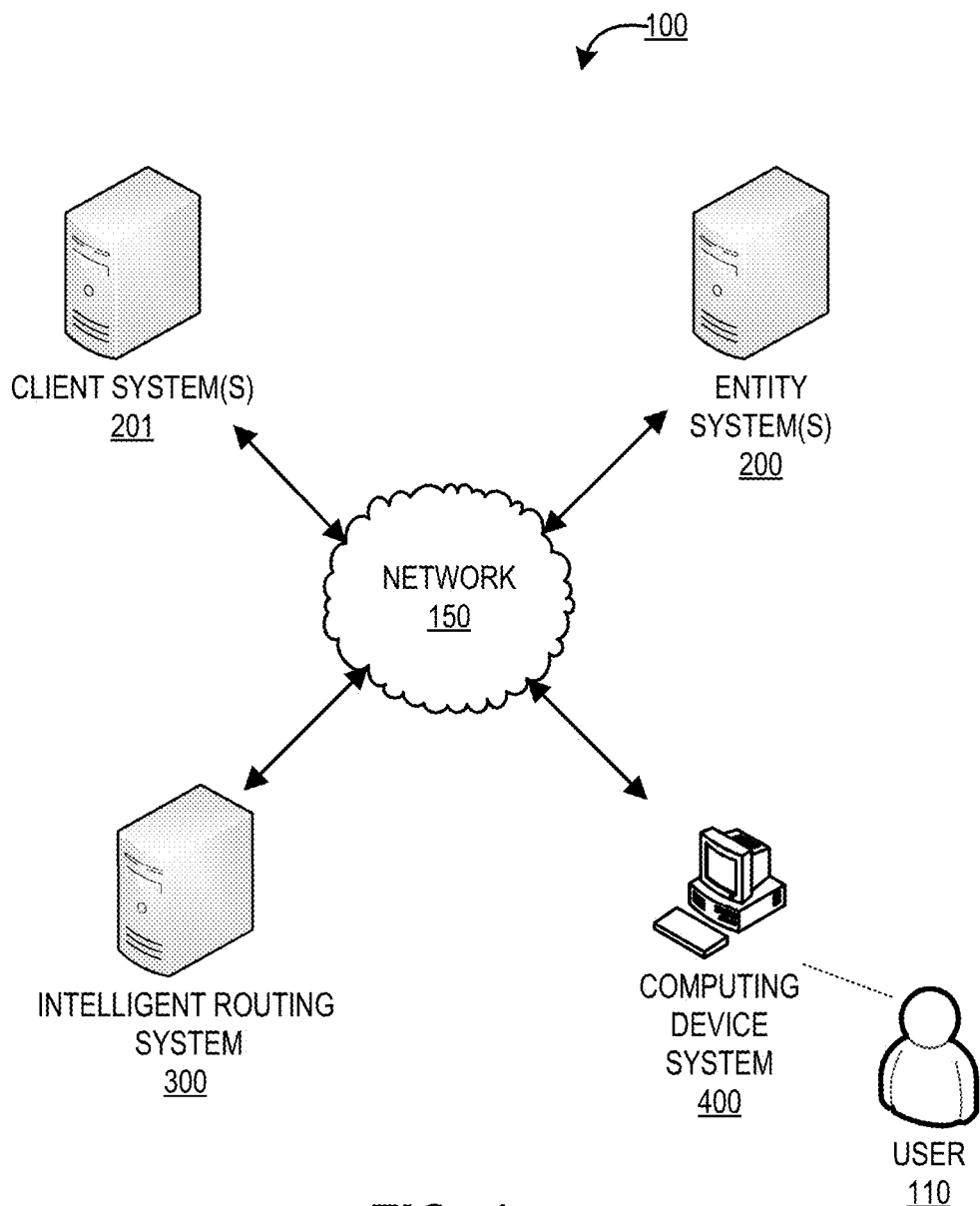
Figure 2:
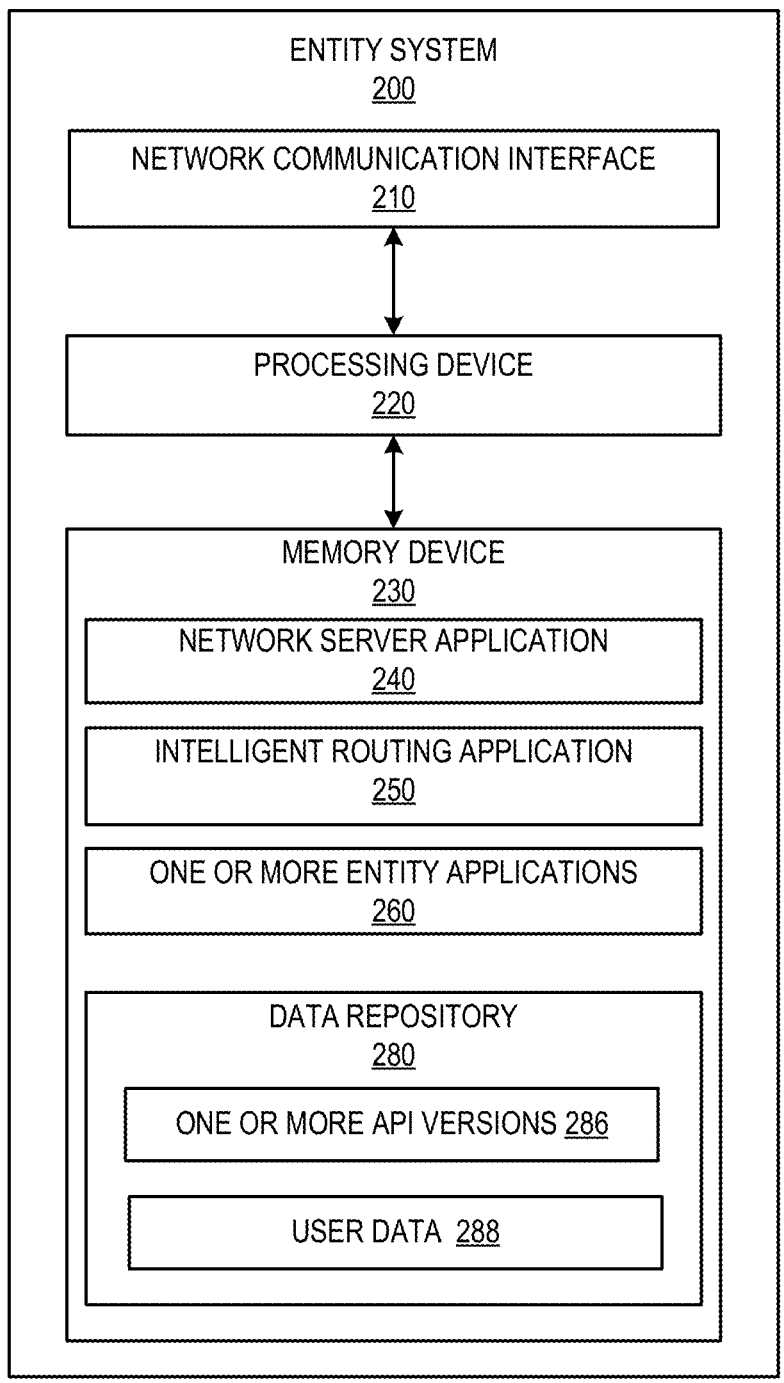
Figure 3:
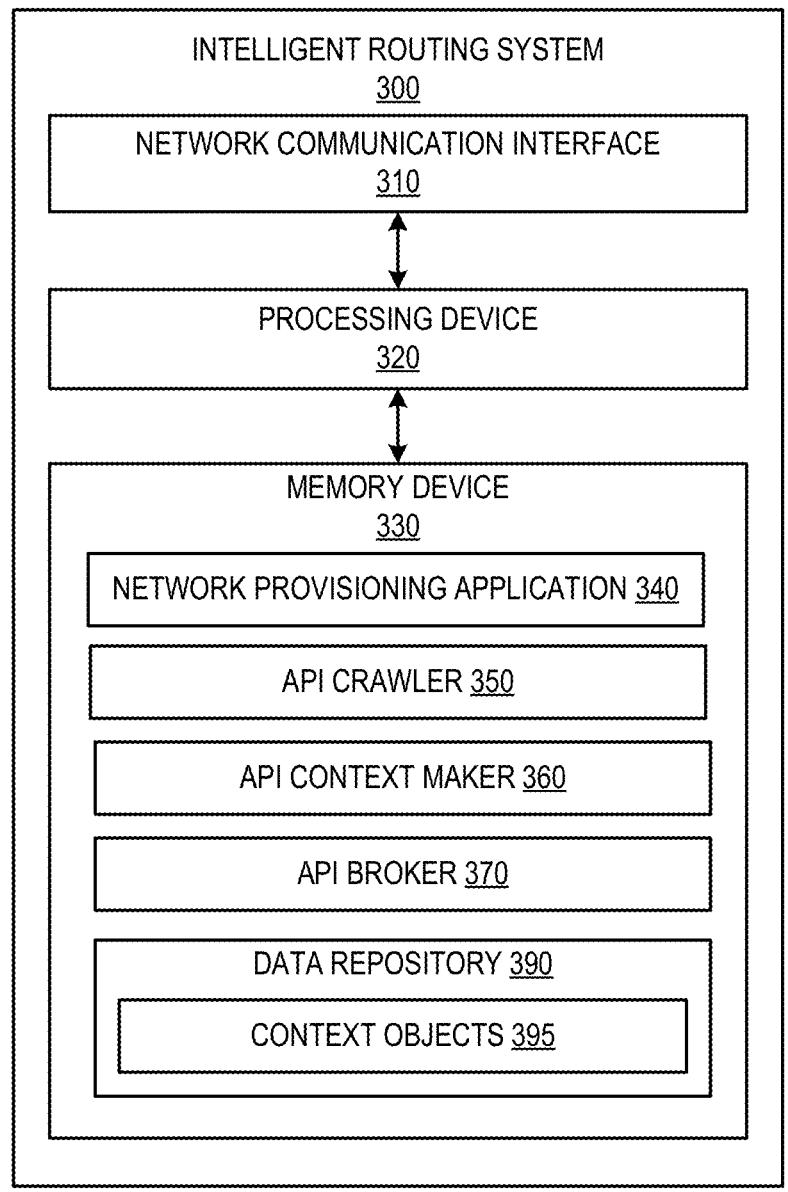
Figure 4:
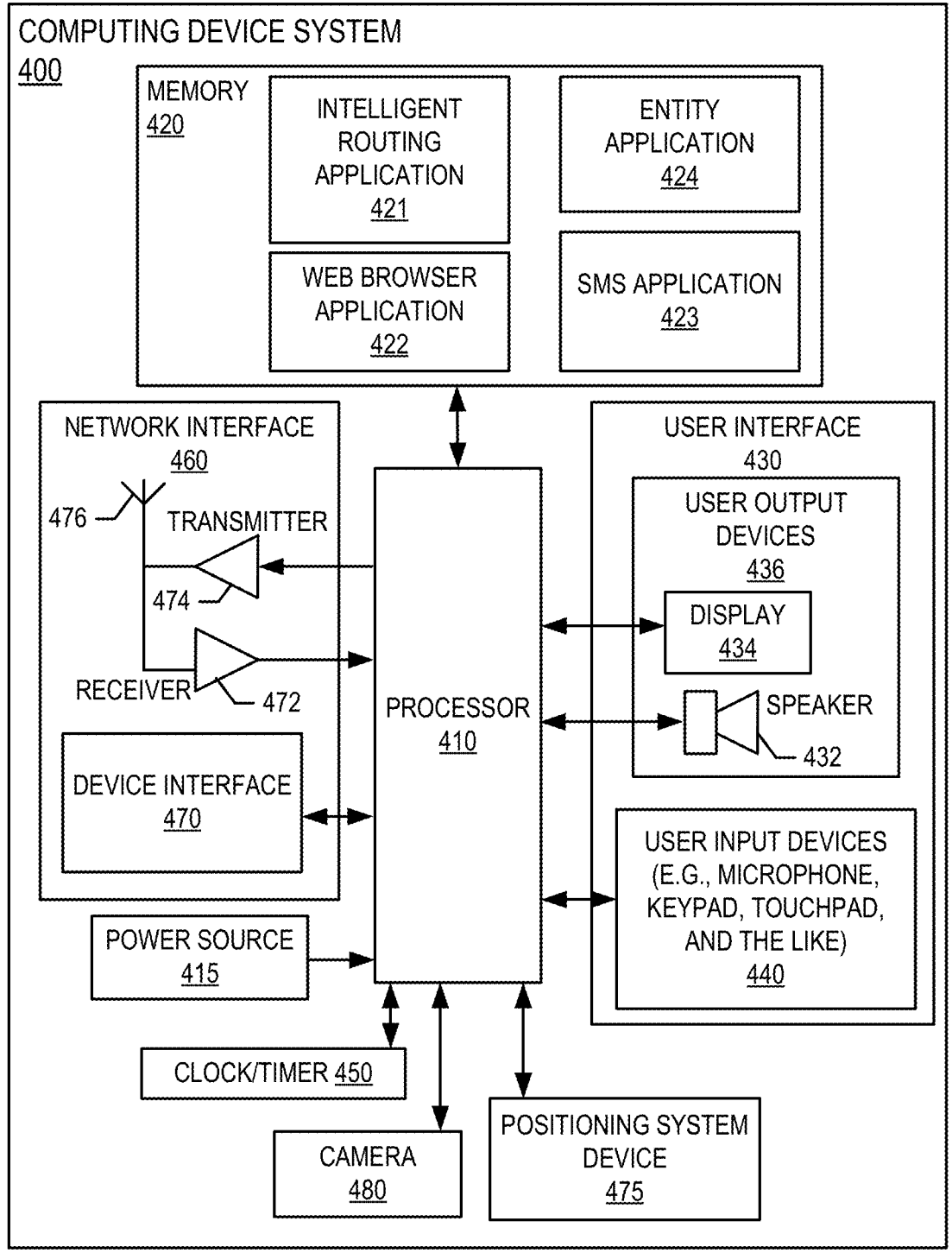
Figure 5:
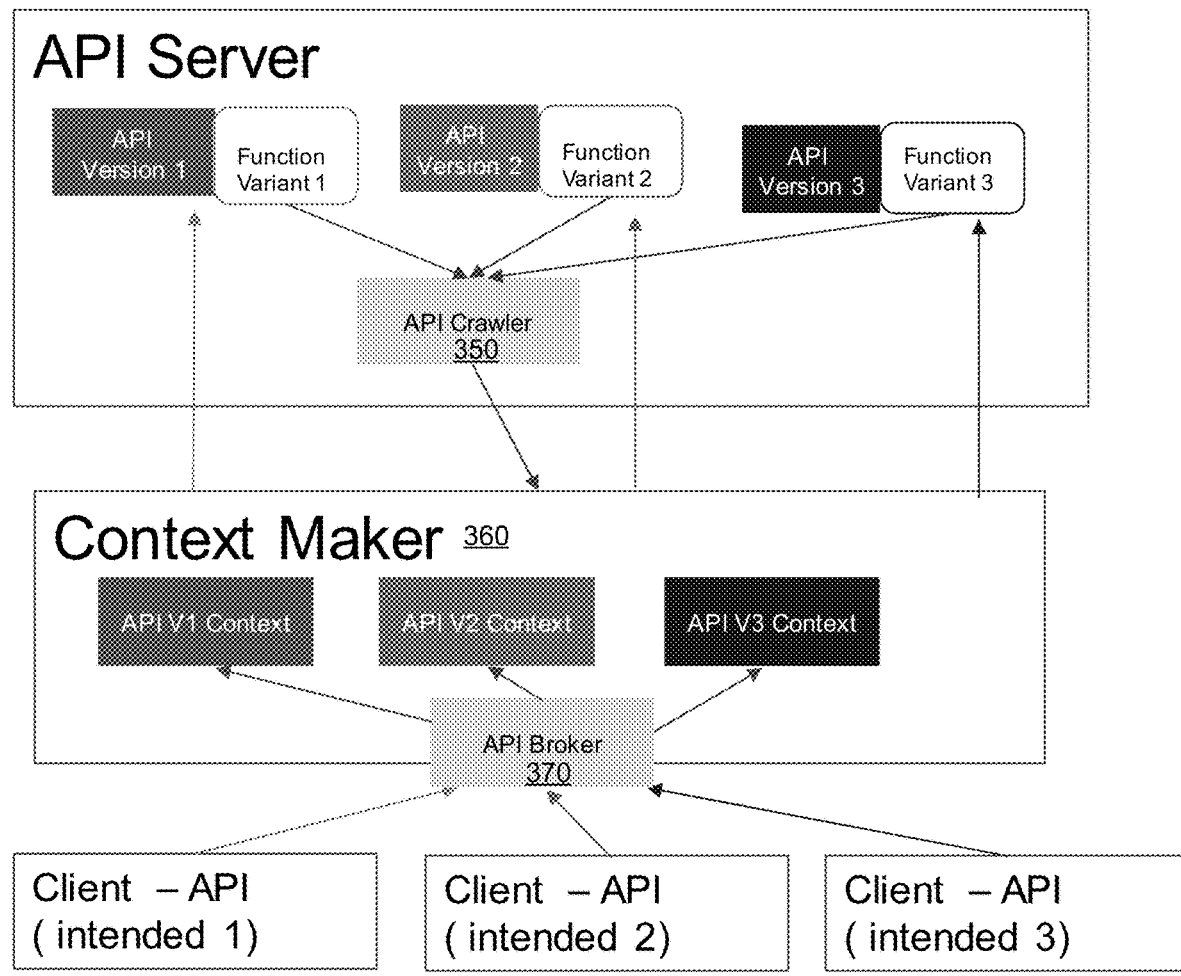
Figure 6A:
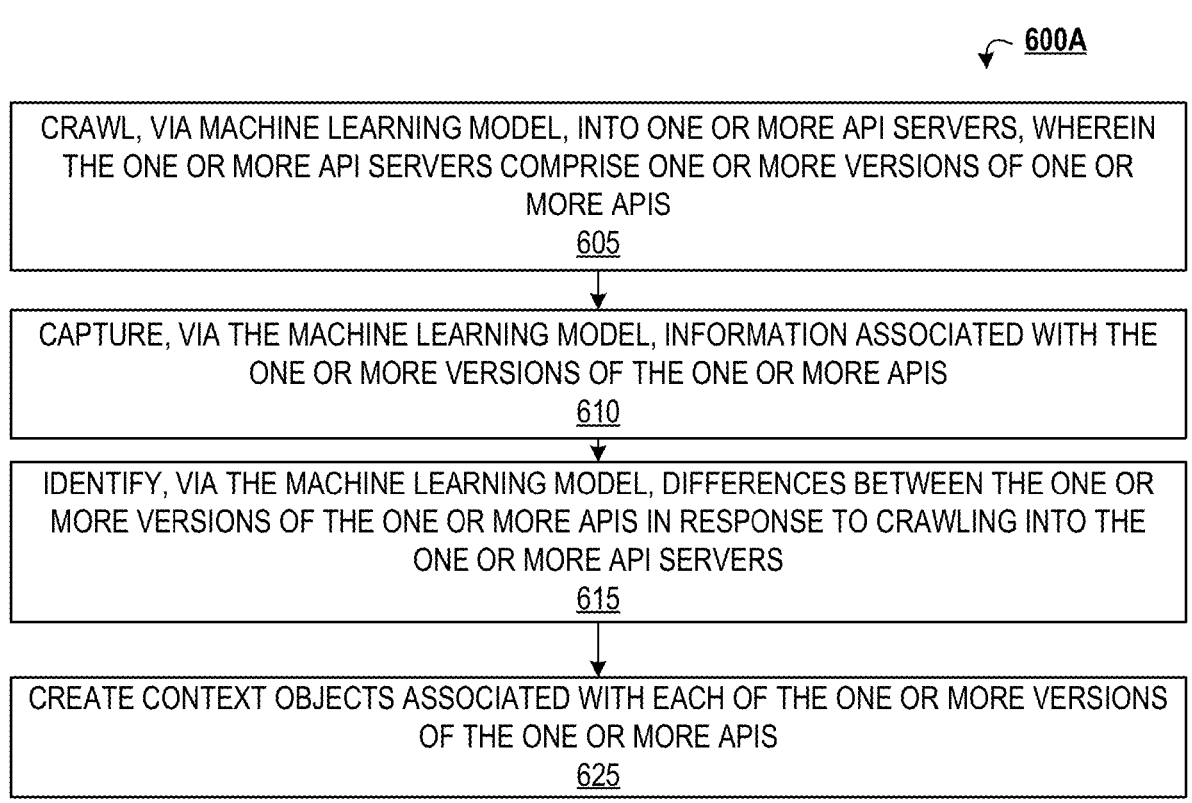
Figure 6B:
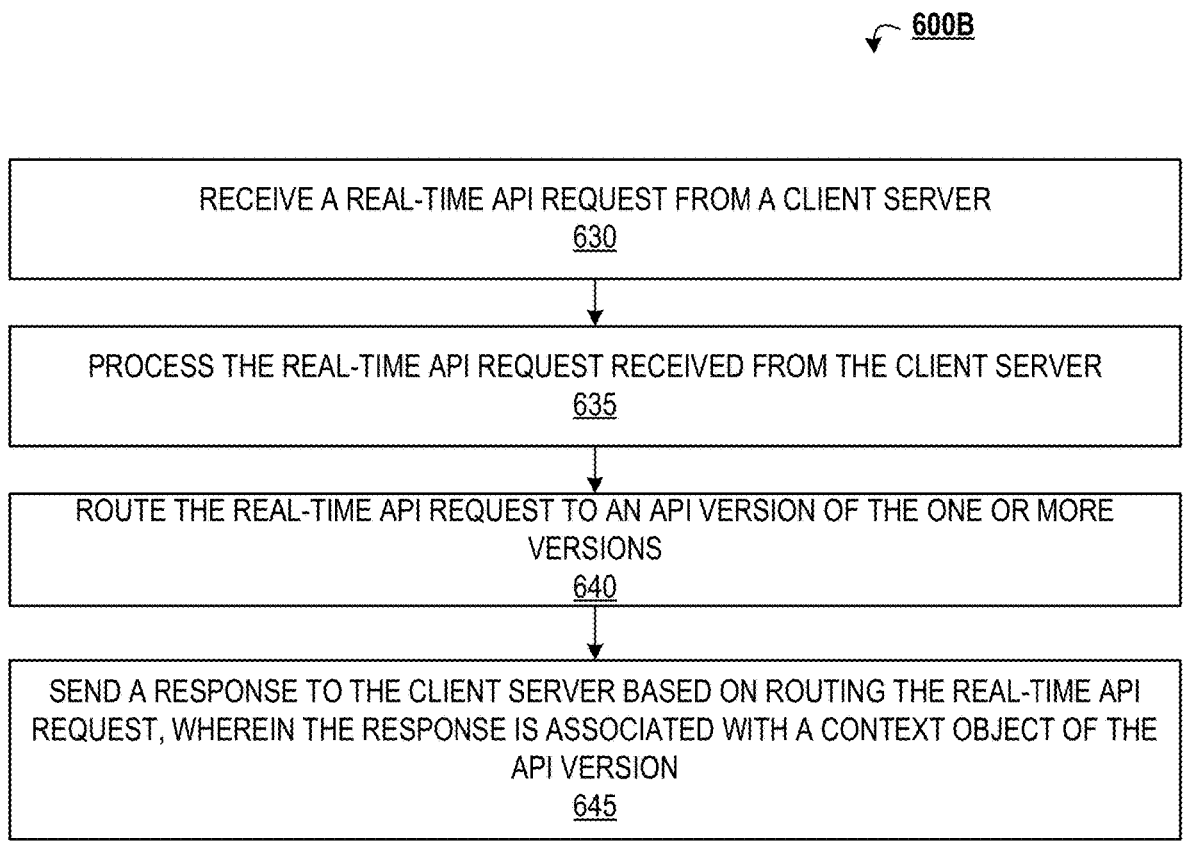

Having thus described embodiments of the invention in general terms, reference will now be made the accompanying drawings, wherein:

FIG. 1 provides a block diagram illustrating a system environment for intelligently processing and routing the incoming API requests, in accordance with an embodiment of the invention;

FIG. 2 provides a block diagram illustrating the entity system 200 of FIG. 1, in accordance with an embodiment of the invention;

FIG. 3 provides a block diagram illustrating a intelligent routing system 300 of FIG. 1, in accordance with an embodiment of the invention;

FIG. 4 provides a block diagram illustrating the computing device system 400 of FIG. 1, in accordance with an embodiment of the invention;

FIG. 5 provides a block diagram illustrating the process of intelligently processing and routing the incoming API requests based on context matching, in accordance with an embodiment of the invention;

FIG. 6A provides a flowchart illustrating a process flow for crawling into one or more API servers and creating context objects associated with one or more API versions present in the one or more API servers, in accordance with an embodiment of the invention; and FIG. 6B provides a flowchart illustrating a process flow for routing the incoming API requests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "entity" may include any organization that utilizes APIs. Furthermore, embodiments of the present invention use the term "user." It will be appreciated by someone with ordinary skill in the art that the user may be an employee of the entity or third-party entity. In accordance with embodiments of the present invention, the term "third party entity" or "calling party" may be any third-party system that may or may not be a customer of the entity. In an embodiment of the present invention, the entity may be a financial institution, the third-party entity may be a merchant, and a user may be an employee (e.g., application developer) of the merchant or the financial institution.

As of today, Application Programming Interfaces (API's) are being used by various entities. With the rapid development of API's that are being generated from multiple streams of functionality in larger enterprises, it is difficult to keep track of the different API's that are being used within a large entity. For each change that is associated with an API, entities create a new version of the API which in turn increases the number of API's that are in an entity. There may be different kind of changes and depending upon the type of changes, multiple versions are created. The different kind of changes may be classified as breaking changes (e.g., a change in the format, response type changes, any specific logic changes) and non-breaking changes (e.g., response parameter addition, or the like).

To manage the multiple versions of API's, conventional systems typically use versioning, custom headers, accept headers, and the like with which the changes are expected at the calling parties. Conventional systems utilize version numbering, publish the version numbering to their calling parties, and establish handshaking in order to route the incoming API request to the correct version of API. Typically, large entities create version numbers for each type of change and publish the version numbers of API's to calling parties. The calling parties use the published version numbers to send out the API requests to the entity. The conventional systems of the entity read the version number in the API request and route the request to the correct API. However, the process of using version numbering and publishing the version numbering to the calling parties may not be efficient as the calling parties may make changes to the version numbering locally on their copy and forget to notify the entity about it. In some other cases, the entity may make changes to the version numbering after publishing the version numbering to the calling parties. In some other cases, the calling parties may create a new request which is associated with version number of an API that has not been generated or published by the entity. As such, usage of version numbering, publishing to calling parties, and establishing handshaking is not an efficient way to receive and serve the request of calling parties. There exists a need for a system to efficiently receive the request of calling parties, process the request, and route the request to the correct API.

The present invention circumvents all the above-noted issues by presenting a way to received and intelligently process and route the incoming API requests from calling parties. Instead of maintaining the different versions, the system of the present invention upon receiving a request from the calling parties, intelligently analyzes the incoming requests without any version numbers and routes the incoming request to the correct API. In some embodiments, the incoming request may be associated with an API or a version of an API that doesn't exist. In such an embodiment, the system of the present invention automatically generates an API or a version of an API and serves the incoming requests dynamically.

FIG. 1 provides a block diagram illustrating a system environment 100 for intelligently processing and routing the incoming API requests based on context matching, in accordance with an embodiment of the invention. As illustrated in FIG. 1, the environment 100 includes an intelligent routing system 300, entity system 200, a computing device system 400, the and client system 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the entity is a financial institution. The client system 201 may be any system associated with a third-party entity. In some embodiments, the third-party entity may be a customer of the entity.

The intelligent routing system 300 is a system of the present invention for performing one or more process steps described herein. In some embodiments, the intelligent routing system 300 may be an independent system. In some embodiments, the intelligent routing system 300 may be a part of the entity system 200.

The intelligent routing system 300, the entity system 200, the computing device system 400, and/or the client system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the intelligent routing system 300 is configured to communicate information or instructions with the entity system 200, the computing device system 400, and/or the client system 201 across the network 150.

The computing device system 400 may be a computing device of the user 11. In general, the computing device system 400 communicates with the user 110 via a user interface of the computing device system 400, and in turn is configured to communicate information or instructions with the intelligent routing system 300, entity system 200, and/or the client system 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In some embodiments, the entity system 200 may be operated by any entity that develops software applications. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an intelligent routing application 250, one or more entity applications 260, and a data repository 280 comprising one or more API versions 286 and user data 288. The computer-executable program code of the network server application 240, the intelligent routing application 250, and the one or more entity applications 260 to perform certain logic, data-extraction, and data-storing functions of the entity system 200 described herein, as well as communication functions of the entity system 200.

The network server application 240, the intelligent routing application 250 and the one or more entity applications 260 are configured to store data in the data repository 280 or to use the data stored in the data repository 280 when communicating through the network communication interface 210 with the intelligent routing system 300, the computing device system 400, and/or the client system 201 to perform one or more process steps described herein. In some embodiments, the entity system 200 may receive instructions from the intelligent routing system 300 via the intelligent routing application 250 to perform certain operations. The intelligent routing application 250 may be provided by the intelligent routing system 300.

FIG. 3 provides a block diagram illustrating the intelligent routing system 300 in greater detail, in accordance with embodiments of the invention. As illustrated in FIG. 3, in one embodiment of the invention, the intelligent routing system 300 includes one or more processing devices 320 operatively coupled to a network communication interface 310 and a memory device 330. In certain embodiments, the intelligent routing system 300 is operated by a first entity, such as a financial institution, while in other embodiments, the intelligent routing system 300 is operated by an entity other than a financial institution. In some embodiments, the intelligent routing system 300 is owned or operated by the entity of the entity system 200. In some embodiments, the intelligent routing system 300 may be an independent system. In alternate embodiments, the intelligent routing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the intelligent routing system 300 described herein. For example, in one embodiment of the intelligent routing system 300, the memory device 330 includes, but is not limited to, a network provisioning application 340, an API crawler 350, an API context maker 360, an API broker 370, and a data repository 390 comprising context objects 395 created by the API context maker and data processed or accessed by one or more applications in the memory device 330. The computer-executable program code of the network provisioning application 340, the API crawler 350, the API context maker 360, and the API broker 370 may instruct the processing device 320 to perform certain logic, data-processing, and data-storing functions of the intelligent routing system 300 described herein, as well as communication functions of the intelligent routing system 300.

The network provisioning application 340, the API crawler 350, the API context maker 360, and the API broker 370 are configured to invoke or use the data in the data repository 390 when communicating through the network communication interface 310 with the entity system 200, the computing device system 400, and/or the client system 201. In some embodiments, the network provisioning application 340, the API crawler 350, the API context maker 360, and the API broker 370 may store the data extracted or received from the entity system 200, the client system 201, and the computing device system 400 in the data repository 390. In some embodiments, the network provisioning application 340, the API crawler 350, the API context maker 360, and the API broker 370 may be a part of a single application. One or more processes performed by the network provisioning application 340, the API crawler 350, the API context maker 360, and the API broker 370 are described in FIG. 5 and FIG. 6.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a intelligent routing application 421, an entity application 424, or the like. These applications also typically instructions to a graphical user interface (GUI) on the display 430 that allows the user 110 to interact with the entity system 200, the intelligent routing system 300, and/or other devices or systems. The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating the process of intelligently routing the incoming API requests, in accordance with an embodiment of the invention. The API crawler 350 crawls into the one or more API servers comprising one or more versions (e.g., API version 1, API version 2, and API version 3 as shown) of one or more APIs. In some embodiments, the one or more API servers are an integral part of the entity systems 200. The API crawler 350 identifies the differences between the one or more versions and identifies the functions associated with each version (e.g., Function Variant 1 associated with API version 1, Function Variant 2 associated with API version 2, Function Variant 3 associated with API version 3 as shown). The API crawler 350 after identifying the functions and gathering information associated with the one or more versions, passes the information and the functions to the context maker 360. The API context maker 360 creates context objects associated with each of the one or more versions, where the context objects comprises context (e.g., API V1 context, API V2 context, API V3 context as shown) associated with the functions and the information associated with the one or more versions. The API broker 370 receives one or more API requests in real-time from one or more client systems 201.

The API broker 370 in response to receiving the real-time API requests (e.g., Client API intended 1, Client API intended 2, Client API intended 3), understands the requirements or context of the real-time API requests and identifies a match between the requirements of the real-time API requests and the context of the one or more versions. The system, in response to finding a match, routes the real-time API requests to the correct version of the API. After routing to the API, the API provides a response for the incoming requirements, where the response is sent back to the client system and the response comprises the content in the context objects created by the context maker 360.

FIG. 6A provides a flowchart illustrating a process flow 600A for crawling into one or more API servers and creating context objects associated with one or more API versions present in the one or more API servers, in accordance with an embodiment of the invention. As shown in block 605, the system crawls, via machine learning model, into one or more API servers, wherein the one or more API servers comprise one or more versions of one or more APIs. For example, if an application is associated with verifying KYC information associated with customers of an entity, multiple versions of API may be created to respond to each type of KYC verification. In an exemplary embodiment, a version may be created that may be used to verify customer address. In another exemplary embodiment, a version may be created that may be used to verify phone number and Social Security Number of a customer. As such, there may be multiple versions of APIs stored in the one or more API servers.

As shown in block 610, the system captures, via the machine learning model, information associated with the one or more versions of the one or more APIs. The system identifies functions associated with each of the one or more versions. For example, the system may identify that a first version may be used to verify customer address.

As shown in block 615, the system identifies, via the machine learning model, differences between the one or more versions of the one or more APIs in response to crawling into the one or more API servers. For example, the system may identify that a first version may be used to verify customer address and a second version is used to verify customer legal name and address.

As shown in block 625, the system creates context objects associated with each of the one or more versions of the one or more APIs. The system creates context objects comprises context associated with the one or more versions. Continuing with the previous example, for the first version, the system may create a context that specifies whether the address of a customer is verified or nor.

FIG. 6B provides a flowchart illustrating a process flow 600B for routing the incoming API requests, in accordance with an embodiment of the invention. As shown in block 630, the system receives a real-time API request from a client system. The real-time API request may include one or more requirements and/or context. For example, the real-time API request may include verify SSN along with a customer name and six digits of Social Security Number.

As shown in block 635, the system processes the real-time API request received from the client system. The system reads and understands the one or more requirements and context of the real-time API request. For example, the system understands that the real-time API request is associated with verifying Social Security Number of a customer.

As shown in block 640, the system routes the real-time API request to an API version of the one or more versions. Continuing with the previous example, the system routes the incoming API request to a version of an API that can verify the Social Security Number of the customer by identifying a match between the requirement of the real-time API request and function of the version of an API. In some embodiments, when the system routes the real-time API request to the API version, the API version provides an output associated with the real-time API request. Continuing with the previous example, when the system routes the incoming API request to the version of API that can verify the Social Security Number of the customer, the version of the API verifies the Social Security Number and provides an output associated with the verification. In another example, if the incoming API request is associated with providing an address of a customer, the system routes the incoming API request to a version of the API associated with providing addresses of customer. In response to receiving the incoming API request, the API version provides an output that comprises the address of the customer.

In an embodiment, where the system is unable to find a match, the system generates an API and routes the incoming API request to the generated API. For example, the system may identify that none of the versions of the APIs meet the requirements of the incoming API request and generates a new API which meets the requirements of the incoming API request.

As shown in block 645, the system sends a response to the client system based on routing the real-time API request. In some embodiments, the system may generate the response by combining an output provided by the API version and context in the context object associated with the API version. Continuing with the previous example, the API may verify the Social Security Number and the system fetches the context object and returns a response to the client system, where the response is associated with the verification of the SSN and is generated based on the context in the context object associated with the API and the output provided by the API.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for intelligent processing and routing of incoming API requests based on context matching, comprising: at least one processing device; at least one memory device; and a module stored in the at least one memory device comprising executable instructions that when executed by the at least one processing device, cause the at least one processing device to: crawl, via machine learning model, into one or more API servers, wherein the one or more API servers comprise one or more versions of one or more APIs; identifying, via the machine learning model, differences between the one or more versions of the one or more APIs based on crawling into the one or more API servers; capture, via the machine learning model, information associated with the one or more versions of the one or more APIs, wherein capturing the information comprises identifying, via the machine learning model, function variants associated with each of the one or more versions of the one or more APIs; create context objects associated with each of the one or more versions of the one or more APIs; receive a real-time API request from a client system; process the real-time API request received from the client system; and route the real-time API request to an API version of the one or more versons;

wherein the executable instructions cause the at least one processing device to: determine that the API version does not exist in the one or more API servers; and generate the API version in response to determining that the API version does not exist in the one or more API servers;

wherein the executable instructions cause the at least one processing device to process the real-time API request based on identifying one or more requirements associated with the real-time API request.

2. The system according to claim 1, wherein the executable instructions cause the at least one processing device to send a response to the client system based on routing the real-time API request, wherein the response is generated based on combining an output provided by the API version and context in a context object associated with the API version.

3. The system according to claim 1, wherein the executable instructions cause the at Last one processing device to route the real-time API request to the API version based on identifying a match between the one or more requirements and the information associated with the API version.

4. The system according to claim 1, wherein creating the context objects comprises creating context associated with each of the one or more API versions.

5. A computer program product for intelligent processing and routing of incoming API requests based on context Matching, comprising a non-transitory computer-readable storage medium having computer-executable instructions for: crawling, via a machine learning model, into one or more API servers, wherein the one or more API servers comprise one or more versions of one or more APIs; identifying, via the machine learning model, differences between the one or more versions of the one or more APIs based on crawling into the one or more API servers; capturing, via the machine learning model, information associated with the one or more versions of the one or more APIs, wherein capturing the information comprises identifying, via the machine learning model, function variants associated with each of the one or more versions of the one or more APIs; creating context objects associated with each of the one or more versions of the one or more APIs; receiving a real-time API request from a client system; processing the real-time API request received from the client system; and routing the real-time API request to an API version of the one or more versions;

wherein the non-transitory computer-readable storage medium comprises computer-executable instructions for: determining that the API version does not exist in the one or more API servers; and generating the API version in response to determining that the API version does not exist in the one or more API servers;

wherein the executable instructions cause the at least one processing device to process the real-time API request based on identifying one or more requirements associated with the real-time API request.

6. The computer program product according to claim 5, wherein the non-transitory computer-readable storage medium comprises computer-executable instructions for sending a response to the client system based on routing the real-time API request, wherein the response is generated based on combining an output provided by the API version and context in a context object associated with the API version.

7. The computer program product according to claim 5, wherein the non-transitory computer-readable storage medium comprises computer-executable instructions for routing the real-time API request to the API version based on identifying a match between the one or more requirements and the information associated with the API version.

8. The computer program product according to claim 5, wherein creating the context objects comprises creating context associated with each of the one or more API versions.

9. A computerized method for intelligent processing and routing of incoming API requests based on context matching, the method comprising: crawling, via a machine learning model, into one or more API servers, wherein the one or more API servers comprise one or more versions of one or more APIs; identifying, via the machine learning model, differences between the one or more versions of the one or more APIs based on crawling into the one or more API servers; capturing, via the machine learning model, information associated with the one or more versions of the one or more APIs, wherein capturing the information comprises identifying, via the machine learning model, function variants associated with each of the one or more versions of the one or more APIs; creating context objects associated with each of the one or more versions of the one or more APIs; receiving a real-time API request from a client system; processing the real-time API request received from the client system; and routing the real-time API request to an API version of the one or more versions;

determining that the API version does not exist in the one or more API servers; and generating the API version in response to determining that the API version does not exist in the one or more API servers;

wherein the method of processing the real-time API request is based on identifying one or more requirements associated with the real-time API request.

10. The computerized method according to claim 9, wherein the method comprises sending a response to the client system based on muting the real-time API request, wherein the response is generated based on combining an output provided by the API version and context in a context object associated with the API version;

wherein the method of processing the real-time API request is based on identifying one or more requirements associated with the real-time API request.

11. The computerized method according to claim 9, wherein the method of routing the real-time API request to the API version is based on identifying a match between the one or more requirements and the information associated with the API version.

12. The computerized method according to claim 9, wherein the method of creating the context objects comprises creating context associated with each of the one or more API versions.

* * * * *